United States Patent [19]

Currie

[11] 4,116,744
[45] Sep. 26, 1978

[54] CONTROL APPARATUS FOR A TIRE BUILDING MACHINE

[75] Inventor: Raymond L. Currie, Findlay, Ohio

[73] Assignee: Cooper Tire & Rubber Company, Findlay, Ohio

[21] Appl. No.: 826,692

[22] Filed: Aug. 22, 1977

[51] Int. Cl.² .................................. B29H 17/20
[52] U.S. Cl. ............................ 156/352; 74/813 C; 156/362; 156/366; 156/405 R; 156/414; 192/142 R
[58] Field of Search .............. 156/350, 352, 362, 366, 156/405, 414–420; 74/2, 10.2, 813 R, 813 C, 568, 568 T; 192/142 R

[56] References Cited

U.S. PATENT DOCUMENTS

| 1,738,503 | 12/1929 | Stevens | 156/405 |
| 3,071,179 | 1/1963 | Tourtellotte et al. | 156/405 |
| 3,654,828 | 4/1972 | Leblond | 156/405 |
| 3,728,181 | 4/1973 | Simmons | 156/405 |
| 3,888,720 | 6/1975 | Habert | 156/417 |
| 3,944,457 | 3/1976 | Podvin et al. | 156/405 |

Primary Examiner—John E. Kittle

[57] ABSTRACT

An apparatus associated with a tire building mandrel for controlling the movements of certain machine members in the delivery and applying of tire building stock to said mandrel. The various types of stock used in the building of a tire are stored in a servicer machine and such stock may be withdrawn and delivered to a building drum or mandrel by an operator during the assembly of a tire. The present apparatus is adapted to control and stop the rotational movements of said drum member at various points in its path of travel thereby allowing the delivery of desired stock length to the building mandrel. The tire building drum may be stopped at different points or locations in its path of travel and with respect to its starting point, the arrangement of which may be determined by the length of amount of stock being withdrawn from the servicer machine or source of supply.

5 Claims, 3 Drawing Figures

CONTROL APPARATUS FOR A TIRE BUILDING MACHINE

BACKGROUND OF THE INVENTION

This invention relates to plastic article shaping or the like and specifically to the rotational control of a tire building drum or mandrel and apparatus associated therewith.

The building of a tire is a manual operation during the time when the various tire components are being placed upon the building drum or mandrel. The usual operation is carried out by the operator withdrawing stock from a servicer machine or source of supply and placing same upon the tire building drum or mandrel. The amount of stock withdrawn from the source of supply must be sufficient to encompass said mandrel and the stock already thereon. Thus, the mandrel or tire building drum may be rotated for one revolution or less and this operation is carried out by the operator moving a foot switch to control drum rotation and, thus, control the "run on" of the stock with respect to the mandrel or building drum.

In supplying stock to a building drum or mandrel, the operator will frequently actuate the foot switch to start and stop the motor and thereby assure that the plystock will not be wrapped around the building drum or mandrel for more than one revolution. The constant interruption of the building drum rotation will result in the plystock being continuously and repeatedly tensioned and relaxed, which produces undue stresses in the plystock material resulting in non-uniform cord end distribution. This is particularly true with radial ply body cord materials wherein the cord ends run parallel to the axis of the building drum and which ends are thus easily dispositioned. Thus, it becomes highly desirous to have an apparatus that would eliminate the frequent stops and starts of the rotating building drum during delivery of the plystock thereto.

A stock carrying rotational drum having associated therewith a device to limit the movement of the drum to a single or one complete revolution are known to those skilled in the art. Such devices are referred to as one revolution devices and same are usually chain driven from the main drum shaft by a suitable chain and sprocket assembly on a one-to-one ratio. In such devices, the driven shaft member carries cam elements that rotate with the driven shaft at all times during rotation of the drum member. There are also shaft and gear members that rotate when clutched in and there are arm members that carry limit switches which are pivoted into contact with said cam elements when energized by suitable solenoid actuation.

During a tire assembly operation, a tire building drum must rotate frequently and at different rotational speeds. A one revolution devices which is chain driven directly from the main drum shaft is provided with stop cams that are located and held on the driven shaft member by frictional pressure only, so that, they can be easily adjusted. Such an arrangement often results in said cams being dispositioned relative to their present drum location or relative to each other by the sudden stop - start actions of the tire building drum. In addition, the relative settings of the cams are known to change during high rotational drum speeds that are used when consolidating tire components. An apparatus or system of the foregoing type is not too reliable because of frequent readjustments that are necessary and the direct drive arrangement is usually costly to maintain. In view of the inaccuracies that can arise from the cam elements, a direct driven one revolution device can be of little value when constructing radial tires which require extremely accurate and consistent placement of all components on the tire building drum.

SUMMARY OF THE INVENTION

The present invention is directed to an apparatus of the one revolution type that may be moved into and out of engagement with a rotatable drum driving member or mandrel of a tire building machine. The apparatus of the present invention normally remains disengaged from the rotatable drum drive member and is only brought into engagement with said drum drive member at certain times upon the actuation of a suitable control. Furthermore, said apparatus is brought into operation when said rotational drum or mandrel member is required to rotate accurately throughout a predetermined arcuate motion.

In the preferred embodiment the apparatus of the present invention comprises a rotatably driven member that is pivotably mounted on a support and arranged to move into driving engagement with a rotatable shaft in the driven train of the building drum under the action of an energized air cylinder or any other suitable power source. The driving member has associated therewith a cam, which upon a certain rotative movement of said driving member, engages a limit switch which stops said drive train and causes said air cylinder to be deenergized thereby causing the driving member to become disengaged from said shaft member. The driving member and associated cams are part of a pivotable housing structure and said elements are maintained against a stop member through the torsional tension of a return spring.

DESCRIPTION OF THE PREFERRED EMBODIMENT

Figure 2:
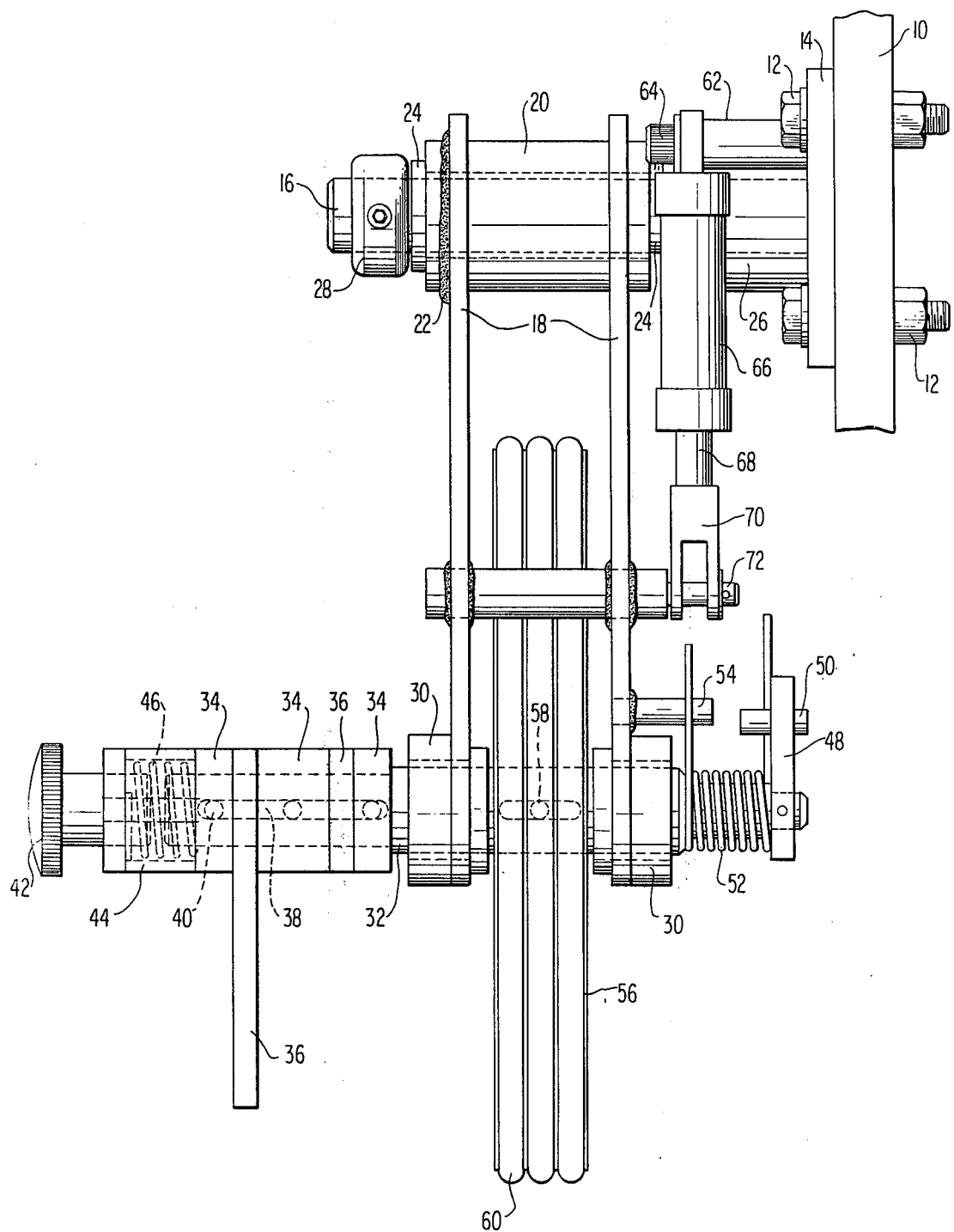
FIG. 2 is a top plan view of the one revolution device embodying the present invention.

Referring to FIG. 2 of the drawings, there is shown a segmental portion 10 of a housing for a tire building machine. The housing 10 has secured to one face thereof, by suitable nuts and bolts 12, a base plate 14. The outer end portion of said base plate 14 has secured thereto by any suitable means, such as welding or the like, a round tubular rod 16 that extends in a plane normal to the outer face of said plate. The rod 16 has positioned thereon in a spaced relation to each other, a pair of plate members 18 which are of angular configuration with the lower portion of said plate members being disposed at substantially right angles to the upper portion. The plate members 18 are supported on a spacing collar 20 that is positioned on the rod member 16 and said plate members may be secured to said collar by suitable means, such as welds 22. There is positioned on the rod 16, a pair of washers 24 with a spacing collar 26 being interposed between the base plate 14 and one of the washer 24. The second washer 24 is maintained on the rod 16 by means of a set collar 28.

The lowermost ends of the angularly disposed plate members 18 have affixed thereto bosses 30 which are adapted to support a rotatable shaft 32. The shft 32 has positioned thereon for rotation therewith a plurality of spacer elements 34. There is also mounted on the shaft 32 intermediate certain of the spacer elements 34 a pair of cam arms 36. The spacer elements 34 are mounted on said shaft 32 for slidable movement with respect thereto and said shaft is provided with a slot or keyway 38 that is adapted to receive fastening elements 40 that extend through said spacer elements. The outer end portion of the shaft 32 is threaded internally to receive a bolt, not shown, which terminates in a knurled head 42. There is positioned on the shaft 32 intermediate the outermost spacer element 34 and the knurled head 42, a collar 44 which is counterbored to receive a coil spring 46. The outer end portion of the collar 44 is drilled and tapped to receive the threaded bolt which forces said collar 44 into engagement with the outermost spacer element 34 which in turn, engages one of the cams 36 and it, in turn, engages the intermediate spacer element 34 to force the second cam 36 into engagement with the innermost spacer element 34.

The other end of the shaft 32 has an arm 48 pinned thereto and said arm has extending from the free end thereof in a plane normal thereto, a stop member 50 which engages one end of a torsion spring 52. The spring 52 encircles the end portion of the shaft 32 with the other end of the spring engaging a stop member 54 that is mounted in the outwardly projecting end portion of one of the plates 18. The shaft 32 has secured thereto intermediate the plate members 18 a rotatable wheel 56 which is secured to said shaft by means of a suitable keyway and pin 58. The wheel 56 is provided with a plurality of peripherial annular grooves that are adapted to receive annular eresilient ring members 60.

Figure 1:
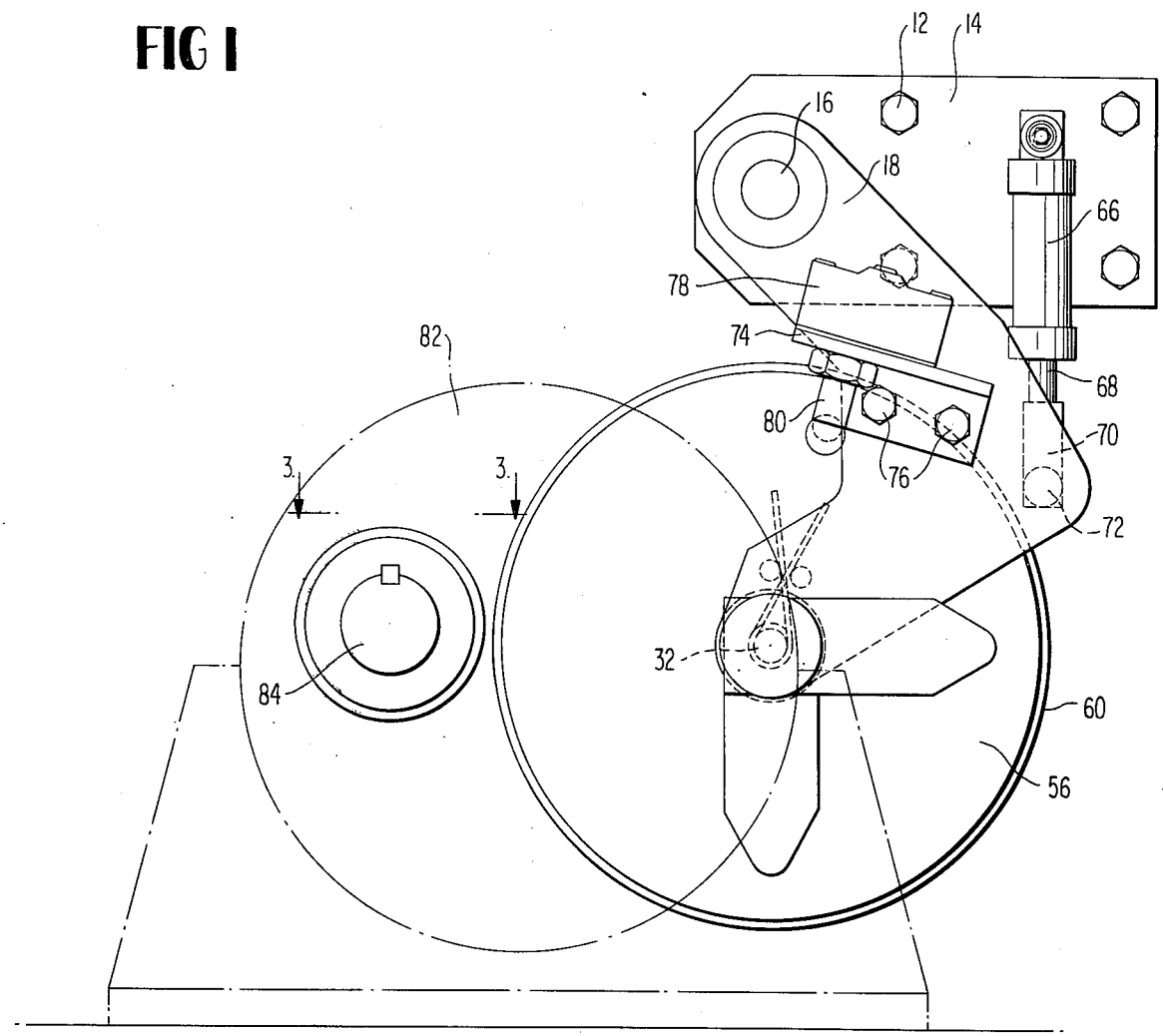
FIG. 1 is an end elevational view of a tire building machine drive train embodying the present invention.

The base plate 14, FIG. 1, has secured thereto and projecting outwardly therefrom a rod 62 which is in spaced parallel relation to the rod 16. The outer end portion of the rod 62 has depending therefrom and secured thereto by a suitable nut 64, an air cylinder 66 which has projecting from the lower end thereof a piston rod 68. The piston rod has mounted thereon a clevis 70 that has pivotly secured therein the reduced end of a shaft 72 which, in turn, is secured to the plate or elements 18.. As shown in FIG. 1, the upper portion or segment of the outermost plate member 18 has an angle iron member 74 mounted thereon by suitable bolts 76 which member is provided with a pair of spaced micro switches 78, of any conventional type, that have depending contact members 80 that are engagable by the cam members 36 in their rotative path of movement.

Figure 3:
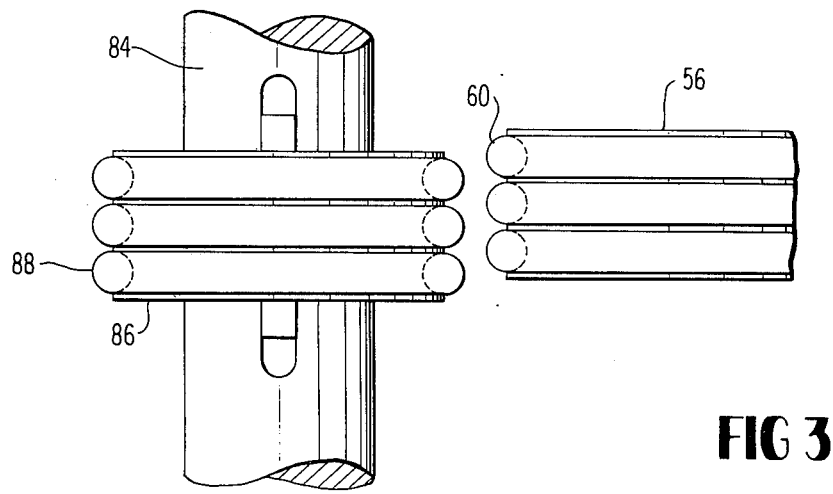
FIG. 3 is a detailed view of the driving means of the one revolution device of the present invention.

The tire building machine as shown in FIG. 1, includes a gear case 82 for enclosing the gear train mechanism of the tire building machine and said gear case is provided with a rotatable shaft 84 projecting outwardly therefrom. The shaft 84 has secured thereto, by any suitable means, a wheel 86 which is adapted to rotate with said shaft 84 and said wheel is provided with a plurality of channels in which are positioned annular resilient elements or members 88. The resilient elements 88 carried by the wheel 86 are positioned in close proximity to the wheel 56 and the resilient elements 60 carried thereby. As shown in FIG. 3, the resilient elements 60 of the wheel 56 are offset slightly with respect to the resilient elements 88 of the wheel 86 so that a single resilient element 88 of the wheel 86 is adapted to be brought into engagement with a pair of resilient elements 60 of the wheel 56. Thus, when the wheel 56 is moved into engagement with the wheel 86, the lowermost element on the wheel 86 will engage the lowermost element on the wheel 56 with the uppermost resilient element on the wheel 56 engaging only the uppermost element on the wheel 86. The other resilient elements on each wheel will engage two elements on the other wheel to effectively cause a driving connnection between the wheel 86 and the wheel 56.

In the use of the one revolution device of the present invention, the shaft 84 is driven at all times when the tire building drum, not shown, is being rotated to receive plystock or the like. At times when the plystock is being directed onto the tire building drum or mandrel, it becomes important that the rotation of the tire building drum be controlled with respect to the degree of rotation. Setting of cams 36 to achieve the proper rotational control is accomplished by manually rotating the knurled head 42 of the bolt so as to reduce the locking force applied against cam 36. Spring 46, however, continues to exert a lateral pressure against cam 36 or multiples thereof disallowing the accidental displacement of cam(s) 36. Cam 36 may then be readjusted rotationally about the center of shaft 32 into any desired position after which the threaded hand knob 42 is tightened again so as to clamp the cam members against and between spacer elements 34.

The operator of the tire building machine then actuates a switch, not shown, which connects the air cylinder 66 to a suitable source of air, not shown, which extends the piston rod 68 causing the clevis 70, and the shaft 72 to move the plate members 18 about the rod 16 so as to bring the wheel 56 with the ring members 60 into engagement with the ring members 88 of the wheel 86. As the wheel 56 is brought into engagement with wheel 86, the wheel 56 is caused to rotate due to the rotation of the shaft 84 from the gear train of the tire building drum or mandrel and said wheel 56 continues its rotation until such time as the cam elements 36 engage the contact or trigger elements 80 of the micro switches 78. Upon the actuation of the switches 78, the rotative movement of the tire building drum is terminated and the delivery of plystock thereto is also terminated which operation determines the amount of material that is placed upon the tire building drum or mandrel at that particular time or operation.

When the cam arms 36 engage the switches 78 to break the circuit to the driving mechanism of the tire building drum, the air cylinder 66 is also de-energized which causes the piston 68 to be retracted, resulting in the withdrawal of the wheel 56 from engagement with the wheel 86 at which time the wheel 56 is rotatibly urged in the opposite direction by means of the torsion spring 52 to its initial or starting position. During the rotational drive of the wheel 56 in its engagement with the wheel 86, the spring 52 is being compressed by means of stop members 50 and 54 so that upon the de-energization of the air cylinder 66 and the disengagement of the wheel 56 from the wheel 86, the wheel 56 with the cam arms 36 will be retracted a distance commensurate with the compression of the spring 52 between the stop members 50 and 54 so that said cam arms 36 returned to their original or initial position.

Although, the foregoing description is necessarily of a detailed character in order that the invention may be completely set forth, it is to be understood that the specific terminology is not intended to be restrictive or confining, and that various rearrangements of parts and modifications of detail may be resorted to without departing from the scope or spirit of the invention as herein claimed.

What I claim:

1. A control apparatus for a tire building machine having a rotatably driven tire building drum with a gear train mechanism therefore positioned within a housing from which a rotatable drive shaft projects, a base plate, a rod connected to said base plate, a pair of spaced depending plate members pivotally mounted on said rod, a shaft rotatably supported in said plate members, a wheel secured to said shaft, a pair of cam arms adjustably mounted on said shaft, switch members mounted on one of said plate members and connected to said tire building drum for controlling the rotation thereof, a wheel secured to said rotatable drive shaft, an air cylinder carried by said base plate and connected to said plate members, means for energizing said air cylinder to move said plate members and wheel into engagement with said drive shaft wheel for rotating said cam arms into engagement with said switch members to terminate the rotative movement of the tire building drum and the de-energizing of said air cylinder.

2. A control apparatus as set forth in claim 1 wherein the shaft carried by said plate members has a spring positioned thereon engaging stop pins carried by said shaft and a plate member to return said cam arms and shaft to its initial position subsequent to said cam arms engaging said switch members.

3. A control apparatus as set forth in claim 1 wherein said wheels are formed with a plurality of annular peripheral grooves with annular resilient ring members positioned therein to effectively rotate one wheel upon its engagement by the other wheel.

4. A control apparatus as set forth in claim 1 wherein said shaft has a plurality of spacer elements secured thereto with said cam arms interposed between certain of said spacer elements, a collar having a recess formed therein positioned on said shaft, a spring member positioned in said recess and engagable with one of said spacer elements, a threaded member engaging said collar for compressing said spring against said spacer element to insure the rotation of said cam arms with said shaft.

5. A control apparatus as set forth in claim 1 wherein said plate members are of angular configuration with the central portion thereof being offset from the upper and lower ends and with said air cylinder connected to said offset portion.

* * * * *